Patented Apr. 8, 1947

2,418,633

UNITED STATES PATENT OFFICE 2,418,633

TREATMENT OF UNSATURATED ALKYD RESINS WITH A MONOHYDRIC ALCOHOL

Charles Gould, Plainfield, N. J., assignor to Marco Chemicals Inc., Sewaren, N. J., a corporation of New Jersey No Drawing. Application January 29, 1944, Serial No. 520,319

23 Claims. (Cl. 260—22)

This invention relates to a new type of polymerizable material, polymers thereof and methods of preparation of these materials. It is known to prepare polymerizable materials by reaction of a dihydric alcohol with an unsaturated dibasic acid or anhydride such as maleic anhydride. Many of these materials such as glycol maleate are hard glassy masses which are exceedingly difficult to handle in subsequent polymerization processes. Others such as triethylene glycol maleate while less viscous are still too viscous for many uses and form polymers which have objectionably low strength and/or chemical inertness.

In accordance with the present invention I have found that superior products which are less viscous and which have greater compatibility with other materials may be prepared by reacting an unsaturated alkyd or other polybasic acid-polyhydric alcohol ester containing unsaturated groups first with a monohydric alcohol preferably containing but a single group capable of being reacted with acid or alcohol generally under conditions such as to effect a substantial reduction of the viscosity of the resin and/or to introduce a substantial quantity of alcohol into the ester. In many cases the alcohol so introduced exceeds the amount accountable for by the reduction of the acid number of the alkyd. Thereafter, the product is reacted with a monobasic acid to esterify free hydroxyl groups. The order of steps herein specified is found to be an important phase of the invention since inferior products are obtained when the resin is treated first with the acid and then with the alcohol or when the alcohol and acid treatments are conducted simultaneously. The resultant product is topped to remove at least a portion of the volatile impurities. The composition thus obtained is a polymerizable material which is less viscous and more easy to handle than other polyhydric alcohol-polybasic acid esters and which forms polymers of high water resistance, strength, hardness and/or durability.

The invention may be applied to the treatment of various alkyd type resins containing unsaturated polymerizable groups. For example, compositions capable of forming hard brittle polymers may be prepared by treatment of unsaturated alkyds formed from a lower glycol containing 2 to 4 carbon atoms between a pair of alcoholic hydroxyl groups such as ethylene glycol, 1,2 propylene glycol, isobutylene glycol, trimethylene glycol, phthalyl alcohol, or 1,4 butylene glycol or other polyhydric alcohols containing up to 4 carbon atoms between a pair of alcoholic hydroxyl groups such as pinacol, glycerol, alpha methyl glycerol, glyceric acid, sorbitol, erythritol, mannitol or higher glycols including pentamethylene glycol and hexamethylene glycol. Products which form somewhat softer polymers may be secured from polymers of the above alcohols such as diethylene glycol, triethylene glycol, tetraethylene glycol, dipropylene glycol, thiodiglycol, diisobutylene glycol, diglycerol, etc. In general the esters prepared from polymeric glycols containing more than 4 glycol units do not polymerize satisfactorily and it is preferred to use alkyds prepared from polyhydric alcohols in which a pair of hydroxyl groups are linked by a chain containing no more than 12 atoms. This chain may be a carbon chain or a carbon chain broken by nitrogen, oxygen or sulphur linking atoms.

The alkyds or polyhydric alcohol-polybasic acid esters herein contemplated are formed by interaction of one or more of the above polyhydric alcohols with a polycarboxylic unsaturated acid including the alpha beta unsaturated polycarboxylic acids such as fumaric, maleic, itaconic, citraconic, acetylene dicarboxylic, glutaconic, methylene malonic, and mesaconic acids. Unsaturated alkyd resin products may be prepared by reacting certain of the above polyhydric alcohols with mixtures of the above unsaturated polycarboxylic acids and saturated polycarboxylic acids such as succinic, malonic, adipic, azalaic, sebacic, or phthalic acids or glycol dichloroformate.

In addition, other polymerizable resinous materials may be prepared by use of excess acid or excess glycol. For example, a resinous material may be prepared by reacting one mole of ethylene glycol or other polyhydric glycol with 1.25 moles or two moles of maleic anhydride or similar unsaturated dibasic acid. Alternatively a resinous ester may be obtained by reacting 1.1 moles of diethylene glycol or other polyhydric alcohol with one mole of fumaric acid or maleic anhydride.

Still other resins may be prepared by reacting mixtures of a polyhydric alcohol such as ethylene glycol, glycerol, etc., with a saturated polycarboxylic acid, for example, phthalic anhydride or succinic acid and an unsaturated alcohol such as allyl, methallyl, crotyl, beta ethylallyl, propargyl, tiglyl, citronellyl, oleyl or cinnamyl alcohol. Other alkyds may be formed by reaction of glycol, phthalic anhydride and an unsaturated monocarboxylic acid such as acrylic, methacrylic, alpha or beta chloro-acrylic, crotonic, oleic, linoleic, ricinoleic or cinnamic acid or with drying oils, or by reaction of glycerol or other polyhydric alcohol with a polybasic acid such as maleic, fumaric, or mixtures thereof and an unsaturated monobasic acid or a drying oil such as linseed or China-wood oil.

Still further types of resinous products may be secured by substitution of maleic acid or fumaric acid for phthalic anhydride in the above compositions. Additionally, unsaturated glycols such as divinyl glycol, the compounds

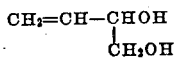

or

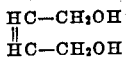

may be reacted in substantially stoichiometric amounts with saturated or unsaturated polycarboxylic acids to form on alkyd type resin containing polymerizable unsaturated groups.

The alkyd resins mentioned above while useful as such, are found to possess numerous objections. For example, ethylene glycol maleate or fumarate of low acid number is a glassy solid at room temperature while the diethylene glycol derivatives are either glassy solids or stiff, slow-flowing liquid or semi-solid compositions of high viscosity which can be handled only with difficulty.

In accordance with the present invention these polycarboxylic acid-polyhydric alcohol esters are reacted with a monohydric alcohol under conditions such that a substantial reaction occurs between the ester and the alcohol and a decrease in viscosity is secured. The results which may be obtained differ to some degree in accordance with the degree of reaction between the polyhydric alcohol and the polycarboxylic acid. For example, when glycol maleate esters having an acid number of 75 or below on the solvent free basis are reacted with the alcohol, the acid number of the resulting product is decreased and the amount of alcohol introduced substantially exceeds that accountable for by reduction in acid number. The product tends to crystallize readily. Moreover the weight of the alcohol treated product after topping exceeds that of the polycarboxylic acid-polyhydric alcohol ester used in the reaction.

When esters of greater acidity are reacted with alcohol the amount of alcohol introduced may be greater or less than that accountable for by reduction in acid number but in either case the weight of the topped reaction product may often be less than that of the polycarboxylic acid-polyhydric alcohol ester used in the reaction. This is probably due to the fact that low molecular weight esters such as alkyl maleates are formed and these esters together with more or less glycol are topped off. Further these products show substantially less tendency to crystallize than products prepared from esters of low acid number and often possess different compatibilities.

Thus the present invention contemplates treatment of polyhydric alcohol-unsaturated polybasic acid esters of low acid number up to about 75 and also treatment of similar esters of higher acid number from 75 to as high as 150 to produce two types of products possessing somewhat different compatibilities and other properties while possessing many common characteristics. The acid number of these materials is computed upon the basis of the ester undiluted with solvents.

Occasionally, it is found that the acid number of a material is not a satisfactory indication of the amount of acid groups which have been neutralized. This is particularly true when the acid number of the material is measured upon the basis of a material containing solvent. A further means of determining the degree of acidity on esterification is afforded by determination of the fraction of the total acidity available from the acid group which has been neutralized. This may be determined by usual titration methods. The present invention is concerned with treatment of esters in which at least about 75 percent of the acidity has been neutralized and is especially directed to esters in which at least about 90 percent of the acidity has been neutralized based upon the number of equivalents of acid or anhydride introduced to form the polycarboxylic acid ester.

The process is particularly directed to preparation of products derived from a saturated alcohol of comparatively low molecular weight and which contains 3 or less carbon atoms in a single chain such as methyl, ethyl, n-propyl, 2 chloroethyl, isopropyl or isobutyl alcohol. Other esters somewhat different in activity and polymerizability may be prepared from low molecular weight unsaturated alcohols containing up to 5 carbon atoms such as allyl, methallyl, crotyl, 2 chloroallyl or propargyl alcohols. In addition somewhat less reactive esters may be prepared from other alcohols including n-butyl, amyl, lauryl, hexyl, oleyl, stearyl, linoleyl, tetrahydrofurfuryl or cinnamyl alcohols with consequent production of products which polymerize to form softer products.

The process may be conducted in the presence of a polymerization inhibitor such as hydroquinone or cuprous chloride in order to minimize polymerization. Also, the reaction may be conducted in the presence of esterification catalysts such as ammonia, hydrogen chloride and toluene sulphonic acid if desired. In such a case it is found preferable to use an easily volatilizable catalyst such as ammonia in order that the esterification catalyst may be removed at least partially during the topping step. Especially advantageous products may be secured by treatment of the advanced esterification products secured by the reaction of a dihydric alcohol such as a glycol or polyglycol with an unsaturated dibasic acid or anhydride such as fumaric acid or maleic anhydride.

The products obtained from these materials are generally liquid or crystalline mixed esters of the polyhydric alcohol of the alkyd and the monohydric alcohol used in treating the alkyd. These liquids may be more or less viscous but are substantially less viscous than the untreated alkyd resin. Moreover, the resulting products usually possess an acid number 20 to 30 percent lower than that of the untreated alkyd although they usually contain some free acid groups. On standing many of the liquid esters particularly those formed from an ethylene glycol ester or from other monoglycol esters prepared from glycols containing up to 4 carbon atoms often crystallize to a crystalline mush. This mush may be remelted on heating to about 50° C.

Alkyd resins prepared by reaction of glycerol or similar alcohol containing more than two hydroxyl groups with maleic anhydride or fumaric acid may be treated by the method herein contemplated either in the A, B or C stage, so long as a substantial portion of the unsaturated groups remain unpolymerized. In such a case the product may be solid or liquid, depending upon the degree of esterification of the alkyd and of the degree of treatment of the alkyd with the monohydric alcohol.

Superior products are obtained when the reaction of the alcohol with the alkyd is effected by heating the alcohol with the alkyd or polyhydric alcohol-polybasic acid under conditions such that no substantial portion of the reactants or reaction products is removed from the system during a major portion of the reaction. This may be effected by conducting the reaction in an autoclave under pressure or under a reflux condenser. By this means alcohol, evolved water, etc., if vaporized, or a portion of these vapors, are condensed and returned to the flask without separation of the constituents. This differs from usual esterification procedures wherein vapors are not returned or where vaporized water is removed from the condensate before returning the condensate to the reaction mixture. This heating is continued until a substantial quantity of the alcohol is taken up. During the reaction some reduction in the acid number of the resin occurs. However, upon topping the reaction product for a time just sufficient to remove most of the unreacted alcohol it is generally found that the amount of alcohol combined with the resin is substantially more than can be accounted for by the reduction of the acid number. Usually the amount of alcohol combined with the resin and unaccounted for by the reduction of the acid number is not less and may be more than 20 percent by weight of the alcohol accounted for by reduction of the acid number and in many cases this percentage is 100% or more. Often the weight of monohydric alcohol introduced may equal one, two or more percent by weight of the alkyd resin undergoing treatment. Preferably, the amount of alcohol introduced should exceed 0.02 mole but should not exceed 0.75 mole and in general should be 0.5 mole of alcohol or below per mole of unsaturated dibasic acid. Where it is found desirable to secure a polymer of maximum hardness and water resistance, the amount of alcohol introduced into the polymerizable composition after topping should not substantially exceed 0.25 mole per mole of unsaturated dibasic acid.

The exact nature of the reaction involved has not been determined in view of the complexity of the molecules involved, but it is believed that the monohydric alcohol breaks the molecular chains of the alkyd resin to shorter molecular linkages, thereby effecting the reduction in viscosity by the decrease in the chain length.

The temperature of reaction is capable of some variation, but in general the process is operated simply by heating the mixture under reflux. Thereby the amount of alcohol and the boiling point thereof determines to a large degree the temperature at which the reaction is conducted.

The time of treatment will vary considerably in accordance with the product desired and the product undergoing treatment. Generally speaking, the viscosity of the product is reduced more or less directly in accordance with the time of heating and thus if a product of low viscosity is desired the alcohol will be refluxed for a long time, whereas for a more viscous product the reflux time will be shorter. The time required for any particular alcohol will depend upon the boiling point and general reactivity of the alcohol used. For example, refluxing of normal propanol with a glycol maleate alkyd for 6 hours yields a satisfactory product. Where isopropyl, methyl, or ethyl alcohol is used 12 or 14 hours or more are required to secure a product of similar viscosity.

In most cases it is found preferable to conduct the reaction upon liquid or at least fusible resins in order to secure materials capable of subsequent use in a convenient manner. Moreover, it is essential that a large portion of the unsaturated groups in the resin remain unpolymerized in order that a readily polymerizable material may be obtained. Consequently, production of the alkyd, the alcoholysis and the topping steps herein contemplated are generally carried out in a substantially inert atmosphere. Carbon dioxide or nitrogen may be bubbled through the reaction mixtures in order to establish such an inert atmosphere. Where difficulty is encountered due to polymerization, inhibitors such as hydroquinone, pyrogallol, cuprous chloride, etc., may be introduced either during the formation of the alkyd or in the alcoholysis reaction or the topping process. More or less water may be present in the alcohol if desired although it is preferred that the reaction mixture be essentially organic in character and that excessive amounts of water be avoided. Alcohol mixtures containing as much as 5 to 20 percent or more water may be used however.

Other alcohol treated products may be prepared by reacting the polybasic acid-polyhydric alcohol ester with a monohydric alcohol in the presence of a solvent such as toluene, benzene or carbon tetrachloride. Often it is desired to heat the mixture, distilling off an azeotropic mixture of solvent and water together with more or less alcohol. These vapors are then condensed, water separated and the solvent and alcohol returned to the mixture in the known manner commonly used in esterification processes. Somewhat more viscous products are secured by this means and it is believed that more esterification of free acid groups and less breaking of chains occurs in such a process than occurs when the mixtures are refluxed. At all events the amount of alcohol taken up by the resin and not accountable for by reduction in acid number is less than when the refluxing method is used.

After the alcohol treatment has been completed the reaction product is reacted with a carboxylic acid. The invention is particularly directed to products which may be prepared from monocarboxylic acids or anhydrides which contain no alcoholic OH groups such as acetic acid or anhydride, propionic acid, acrylic acid, methacrylic acid, propionic acid, alpha chloracrylic acid, butyric acid, oleic acid, linoleic acid, drying or nondrying oil acids including China-wood oil acid, linseed oil acid or cocoanut oil acid, cinnamic acid, benzoic or chloracetic acids. Products which form polymers somewhat lower in water resistance may be obtained from hydroxy monocarboxylic acids such as glycolic, lactic, salicylic or ricinoleic acids.

The reaction may be effected by adding the acid or the anhydride to the reaction mixture obtained by the alcohol treatment and heating the mixture at a temperature suitable for the esterification of the acid or anhydride used. Usually this temperature should not exceed the distillation point of the acid or anhydride. Heating is continued for a period of two or three hours in most cases. The amount of acid used is generally 2 to 25 percent by weight of the reaction mixture to which it is added. Generally the amount is sufficient to permit esterification of at least a major portion of the free hydroxyl groups in the composition.

In some cases it is desirable to remove a portion or all of the low boiling fractions from the alcohol treated product before addition of the acid or anhydride. This may be done by topping at atmospheric pressure or under vacuum. In many cases however, this may be dispensed with.

The reaction product formed after addition of the monobasic acid may be topped by heating to 150–200° C., preferably at an absolute pressure below about 300 mm. of mercury. Where the acid number of the product is undesirably high, for example 50 or above, it is desirable to continue the topping either at atmospheric or subatmospheric pressure for a time sufficient to reduce the acid number below 50, preferably 35 or below. Heating at a pressure of 300 mm. of mercury or below is preferable since this speeds the reaction and permits use of a lower temperature. Usually it is undesirable to carry the reduction of acid number too far since the product may be objectionably viscous and in general the reaction is discontinued when the acid number is about 15 to 50 (i. e. about 95 to 99 percent of the equivalents of acid are neutralized).

The resulting products are generally viscous liquids which contain at least two polymerizable unsaturated groups derived from the dibasic acid. On standing these liquids often crystallize to form a mush comprising crystals and liquid. These crystals generally melt at temperatures of 50 to 100° C. The compositions contain in general at least about 0.02 and generally not more than 0.25 to 0.5 mole of the monocarboxylic acid radical per mole of dibasic acid in addition to the monohydric alcohol combined in the proportions previously set forth.

The various reactions herein described may be conducted in an inert atmosphere by bubbling carbon dioxide through the reaction mixture. Polymerization inhibitors such as phenol, hydroquinone, diphenylamine, etc., may be incorporated to inhibit polymerization during processing.

Where a polymerization inhibitor is used some portion or all of the inhibitor may be topped off or removed during the topping. This is particularly true where hydroquinone, pyrogallol or phenylene diamine are used as inhibitors. This affords a simple method by which the polymerizable composition may be prepared in the presence of an inhibitor and subsequently made inhibitor-free or made to contain a controlled quantity of inhibitor as desired. Where removal of the inhibitor is undesirable, less volatile inhibitors such as copper resinate, cuprous chloride, sulphur, etc., may be used.

These new compositions are readily polymerizable and a wide variety of polymers may be obtained by polymerizing these materials by means of heat, light or with peroxide, etc. The composition may be cast polymerized by conducting polymerization in a casting cell comprising a pair of glass sheets separated by a flexible elastic separator such as a gasket of rubber, polyvinyl chloride plastic such as "Koroseal," polyisobutylene, polychloroprene, etc., the entire assembly being clamped together by suitable means. In order to minimize fracturing, it is often desirable to coat the glass or metal surface of the cell with a lubricant such as lauryl phosphate, zinc stearate or neat's-foot oil.

Laminated products may be prepared by impregnating a plurality of layers of fibrous material such as leather, paper, woven or felted glass fiber or mineral wool, muslin, duck, canvas or other cotton or wool fabrics, linen, etc., with the ester containing a suitable polymerization catalyst such as benzoyl peroxide. The impregnated sheets may then be placed between a pair of cover sheets or within a sheath or bag which may be of a flexible material such as metal foil, thin transparent sheets or foils of Cellophane, cellulose acetate polyvinyl alcohol, polyvinyl ether, etc. and the assemblage treated by suitable means to remove air and to prevent reintroduction of air therein. For example, a laminate may be formed by placing a plurality of superposed layers of fabric upon a larger sheet of Cellophane or polyvinyl alcohol so that the edges of the Cellophane or polyvinyl alcohol sheet extend beyond the edges of the fabric. The fabric is then impregnated by pouring a desired quantity of the polymerizable liquid which may comprise the liquid ester of Example 1 together with 20 percent by weight of diallyl phthalate and 3 percent by weight of benzoyl peroxide thereon and soaking the fabric. A top cover sheet of the Cellophane or polyvinyl alcohol is laid upon the fabric and the assemblage pressed or rolled or otherwise treated to force air and excess polymerizable liquid to the outer edges of the fabric. By this means the cover sheets are forced into tight adhesion with the fabric and are substantially free from wrinkles. Moreover, exudation of the excess polymerizable liquid from the edges of the fabric contacts the overlapping edges of the cover sheets thereby sealing the top and bottom cover sheets to each other and forming a sheath about the laminate preventing introduction of air therein. The laminate is then heated to a temperature of 75 to 115° C. to polymerize the sheet. Thereafter, the sheath may be removed.

Flat laminates may be made in the above manner continuously by passing a continuous web of an impregnated laminate covered with top and bottom continuous webs of the flexible cover which overlap the sides of the laminate, between rolls. These rolls continuously squeeze out entrapped air and excess monomer and seal the edges. The web may then be passed in a continuous manner into an oven where the assemblage is cured.

Because of the comparative viscosity of these new compositions and their adhesive character in their unpolymerized or partially polymerized state, laminated parts may be readily built up. Thus curved parts may be built up by applying the layers to a curved mold and relying upon the adhesiveness of the new composition or its partial polymer to hold the layers in place. Unlike many polymerizable liquids these new compositions do not drain from the fibrous laminate during polymerization and accordingly preparation of curved laminates is much easier with my composition than with other materials.

The esters herein contemplated may be polymerized with other polymerizable unsaturated materials such as vinyl chloride, vinyl acetate, styrene, butadienol, 3; beta chloro-butadiene 1, 3; the alpha substituted acid esters, nitriles or amides including methyl, ethyl, butyl, allyl, crotyl or methallyl acrylate, alpha chloroacrylate, methacrylate, etc., glycol dimethacrylate, glycerol di- or tri-methacrylate, glycol diacrylate, acrylonitrile, etc., or other polymerizable materials including diallyl, dimethallyl, divinyl, di-isopropenyl, or dicrotyl carbonate or other corresponding unsaturated alcohol polyesters of polybasic acids such as phthalic, maleic, oxalic, citric, tartaric, succinic, adipic or fumaric acids or the esters of the above unsaturated alcohols and unsaturated acids such as cinnamic or crotonic acids or esters of (a) a polyhydric alcohol and (b) an acid ester of a polybasic acid and an unsaturated alcohol such as ethylene glycol bis (allyl carbonate) or other compound described in co-pending application filed by Franklin Strain and Irving E. Muskat, Serial No. 403,703, filed July 23, 1941.

The compositions prepared in accordance with the present invention are found to be miscible with many of the above polymerizable materials in substantially greater proportions than are the alkyd resins from which these new compositions are prepared. For example, one part by weight of an unsaturated alkyd prepared from fumaric acid and diethylene glycol is compatible with less than 0.7 part by weight of monomeric styrene whereas the new monomeric fumarates herein described generally are compatible with monomeric styrene in all proportions. A similar difference in compatibility is observed respecting the corresponding maleate derivatives. Furthermore, when mixtures of styrene and unsaturated alkyds are polymerized only those mixtures containing comparatively low concentrations of styrene produce compatible copolymers. In contrast the alcohol treated alkyd resins herein contemplated may be polymerized with substantially higher quantities of styrene to produce compatible copolymers.

*Example 1*

20 moles of maleic anhydride and 20 moles of diethylene glycol were placed in a flask and heated at a temperature of 180 to 212° C. for about 12 hours and a resin having an acid number of 45.2 was obtained. During the reaction carbon dioxide was bubbled through the reaction mixture and the mixture was continually agitated. The resin thus obtained is a clear almost solid mass at room temperature, but is a fluid liquid at 200° C. 523 grams of diethylene glycol maleate alkyd so prepared was heated under reflux with 56 grams of normal propanol for 9.5 hours, the temperature gradually rising to about 150° C. and the mixture was topped under a pressure of 10 mm. at 180-200° C. 50% of the propanol was taken up by the compound. The resulting product was a yellow polymerizable liquid which was more fluid than the alkyd from which it was prepared and which had an acid number of 25.4.

A quantity of this material was heated with 15% by weight of acetic anhydride at 120-130° C. for two hours. The composition was then topped at 10 mm. pressure and a temperature of 180° C. and a liquid having a viscosity about the same as that of the propylized alkyd was secured. This material polymerized in the presence of 5 percent benzoyl peroxide when heated according to the following cycle:

16 hours at 50° C.
1 hour at 65° C.
2 hours at 70° C.
1 hour at 75° C.
2 hours at 80° C.
1 hour at 85° C.
1 hour at 90° C.
0.5 hour at 95° C.
1 hour at 115° C.

The polymer had a Barcol hardness of 45, and was substantially more water resistant than the polymer of the propyl alcohol treated material before acetylation.

Similar products may be prepared by use of oleic acid, stearic acid, ethyl chloroformate, allyl chloroformate, propionic acid, butyric acid, etc., in lieu of acetic anhydride.

A similar reaction may be secured using ethyl or lauryl alcohol in lieu of normal propyl alcohol in this process. Moreover, propylene glycol or similar glycol may be substituted for diethylene glycol and itaconic acid substituted for fumaric acid.

*Example 2*

20 moles of maleic anhydride and 20 moles of diethylene glycol were placed in a flask and heated at a temperature of 180 to 212° C. for about 12 hours and a resin having an acid number of 45.2 was obtained. During the reaction carbon dioxide was bubbled through the reaction mixture and the mixture was continually agitated. The resin thus obtained is a clear almost solid mass at room temperature, but is a fluid liquid at 200° C. When polymerized in admixture with vinyl acetate compositions containing 30 percent by weight vinyl acetate polymerize to clear polymers while compositions containing 40 percent by weight of vinyl acetate polymerize to form an opaque mass, thus indicating incompatibility. 3787 grams of the alkyd thus prepared were placed in a flask provided with a reflux condenser and 326 grams of methyl alcohol was added. The mixture was agitated vigorously and heated under reflux while carbon dioxide was bubbled through the reaction mixture. Heating was continued for 30 hours at reflux temperature. The product thus obtained was then topped at 180-200° C. at a pressure of 8 mm. of mercury until the methyl alcohol, free polyglycol and other volatile components were removed. Approximately 40 percent of the added methanol was absorbed. The product obtained was an amber, high boiling liquid which flowed readily at 0 to 20° C. and had an acid number of 28.4. 160 grams of the methyl alcohol-treated product was placed in a flask with 25 grams of acetic anhydride and the mixture heated at 135° C. for about 3 hours.

During the preparation of the alkyd and the alcohol and acid treatments carbon dioxide was bubbled through the reaction mixture to establish an inert atmosphere. This product was then topped at 140° C. at a pressure of 2 mm. of mercury until the expiration of two hours after distillation of volatile matter therefrom had ceased.

This methylated acetylated product is a fluid amber liquid which is miscible with vinyl acetate or styrene. When 5 percent by weight of benzoyl peroxide was dissolved therein and the product cured according to the following cycle:

16 hours at 50° C.
1 hour at 65° C.
2 hours at 70° C.
1 hour at 75° C.
2 hours at 80° C.
1 hour at 85° C.
1 hour at 90° C.
0.5 hour at 95° C.
1 hour at 115° C.

a clear hard brittle polymer having a Barcol hardness of about 35-37 was obtained. Two parts by weight of this material may be copolymerized with up to three parts by weight of styrene to form clear copolymers, and the material copolymerizes to form compatible copolymers with all concentrations of diallyl phthalate.

The process may be conducted in a similar manner using fumaric or itaconic acids in lieu of maleic anhydride. In such a case somewhat more actively polymerizable materials and harder polymers are secured.

Example 3

The process of Example 2 was repeated, using 176 grams of acetic anhydride and heating at 140–150° C. for about 2 hours. The product after topping was a viscous liquid which polymerized as in Example 2 to form a product somewhat harder and more water resistant than the product of Example 2.

Example 4

The process of Example 2 was repeated, using 10 percent by weight of isobutyl alcohol in lieu of methyl alcohol. The product after treatment with acetic anhydride as in Example 2 and topping was a viscous liquid which polymerized upon heating with 5 percent benzoyl peroxide according to the cycle of Example 1 to form a clear casting having a Barcol hardness of 28–35. Compatible copolymers can be secured from styrene or diallyl phthalate mixtures with this material containing as much as 90 percent of styrene or diallyl phthalate.

A similar process may be conducted using fumaric acid in lieu of a portion or all of the maleic anhydride. Moreover, somewhat softer polymers may be obtained by use of triethylene glycol or tripropylene glycol in lieu of diethylene glycol.

Example 5

20 moles of each of maleic anhydride and ethylene glycol was heated with agitation and under an inert atmosphere for 14 hours at 150 to 190° C. until a product having an acid number of about 43 was obtained. 2758 grams of the alkyd thus obtained and 312 grams of methanol were placed in a flask provided with an agitator and heated under a reflux condenser while $CO_2$ was bubbled through the mixture. The temperature gradually rose from 100 to 160° C. and reflux was continued for 28 hours. The resulting mixture was then topped at 10 mm. pressure and a temperature of 190° C. to remove volatile impurities including free alcohol. 65 percent of the added methanol was absorbed. The product was a fluid liquid which had an acid number of 27. On standing for several days the liquid crystallized to a crystalline mush which could be melted by heating to 70° C. 183 grams of the methylated product and 51 grams of acetic anhydride was placed in a flask equipped with a stirrer and gas inlet. The mixture was heated under a reflux condenser at 140° C. for 5 hours. The resulting product was topped by heating under a pressure of 2 mm. of mercury at 150–160° C. for 2½ hours. The product obtained is a clear yellow viscous liquid having a slight odor of acetic acid, which crystallized to a crystalline mush after standing for several days. When 3 to 5 percent benzoyl peroxide is dissolved therein the product polymerizes on heating according to the cycle of Example 1 to a clear, water-resistant polymer having a Barcol hardness of about 25–30. Compatible copolymers may be prepared from mixtures containing up to 50 percent of styrene.

Example 6

242 grams of the methylated ethylene glycol maleate prepared as in Example 5 was placed in a flask with 24.2 grams of oleic acid and the mixture heated under a reflux condenser at 160° C. for 4 hours. The resulting product was separated from residual oleic acid and was topped at 200–230° C. for 4 hours. The product was a cloudy liquid which polymerized with 3 to 5 percent benzoyl peroxide to form a water-resistant polymer having a Barcol hardness of about 50 and unusually good water resistance.

Example 7

878 grams of an ethylene glycol maleate alkyd prepared as in Example 5 and having an acid number of 45 was heated with 124 grams of normal propanol as in Example 5 for 7 hours and the mixture topped as in Example 5. 50 percent of the propanol was absorbed. The resulting liquid had an acid number of 28. On standing the mixture crystallized to a solid crystalline mush which could be melted by heating to about 60 to 70° C.

The propylated composition was then heated with 6 percent by weight of acetic anhydride at 135° C. in an atmosphere of carbon dioxide for 3 hours. The acetylated product was topped by heating at 185 to 200° C. for several hours at 2 mm. pressure. The topped product is a viscous liquid which crystallizes to a mush comprising crystals and uncrystallized liquid on standing. Polymers of this material prepared according to the method of Example 1 were clear resins having a Barcol hardness of 45–50 and very high water resistance. Compatible copolymers may be secured from mixtures containing up to 90 percent by weight of diallyl phthalate and mixtures containing up to 50 percent styrene or vinyl acetate.

This process may be used to prepare corresponding products using ethanol, isopropanol, normal butanol or isobutanol. In the case of isopropanol, refluxing generally requires 2 to 5 times the time required for normal propanol. Butanol derivatives are somewhat softer than the isobutanol, isopropanol or ethanol derivatives.

Example 8

The process of Example 7 was repeated using oleic acid in lieu of acetic anhydride and heating at 150–160° C. The reaction product was opaque. It was topped at 200° C. at a pressure of 2 mm. for 3 hours. Upon cooling the product solidified to an essentially crystalline mass. A milky polymer was obtained by mixing the solid mass with 5 percent by weight of benzoyl peroxide and heating as in Example 1. This product had a Barcol hardness of 55 and very good water resistance.

Example 9

An alkyd was prepared in the usual manner by heating equal molar quantities of diethylene glycol and fumaric acid in a flask provided with an agitator at 175 to 200° C. for 7 hours while bubbling $CO_2$ through the mixture. The alkyd had an acid number of 39. A mixture of 3337 grams of the alkyd and 475 grams of methanol was placed in a flask equipped with an agitator and heated under a reflux condenser at reflux temperatures for 24 hours. About 50 percent of the methanol was taken up.

15 percent by weight of acetic anhydride was added and the mixture was heated in an inert atmosphere at 135° C. for 3 hours. The mixture was topped at 190° C. and 2 mm. pressure for 3 hours. The product was a liquid which partially crystallized on standing. It polymerized to form a polymer somewhat harder than the corresponding maleate resin.

Example 10

The process of Example 9 was repeated, using 107 grams of the alkyd to 17 grams of allyl alcohol and heating at reflux temperature for 17 hours. This product was reacted with acetic anhydride and a composition which could be polymerized to a hard polymer was secured.

Example 11

A quantity of resin having an acid number of 52 was prepared by reacting 94 parts by weight of glycerol, 160 parts by weight phthalic anhydride, 80 parts by weight of China-wood oil, as in Example 3 of U. S. Patent 2,072,068. The resin was heated under reflux with 15 percent by weight of normal propanol in the presence of 0.1 percent hydroquinone. A viscous liquid was obtained which was topped at 200° C. and a pressure of 1 mm. of mercury until volatile materials were removed. The resulting product is a polymerizable viscous liquid and dries to a hard film upon heating at 100° C. in the presence of the drier such as cobalt linoleate.

This product was placed in a flask and heated with 15 percent by weight of acetic anhydride and 0.1 percent by weight of hydroquinone at 135° C. for 3 hours. A viscous polymerizable liquid was secured.

Example 12

20 moles of fumaric acid, 2 moles of phthalic anhydride and 22 moles of ethylene glycol were placed in a round bottomed flask equipped with a mercury sealed stirrer, gas inlet and a 6 inch column attached to a Liebig condenser. The system was gas tight. The mixture was heated to 188° C. and heating was continued for a period of 6 hours during which the temperature rose to 200° C. and approximately 35 moles of water was distilled off. During heating carbon dioxide was bubbled through the reaction mixture thereby establishing a substantially inert atmosphere within the flask. The product thus secured had an acid number of about 115.

332 grams of normal propanol was added to the flask and the mixture was refluxed for 6 hours at a temperature gradually rising from 126 to 169° C. During the heating the mixture was agitated and carbon dioxide bubbled through to establish an essentially inert atmosphere. The acid number of this product was approximately 90. 218 grams of acetic anhydride were added to the flask and the mixture heated under a reflux condenser and in an inert atmosphere for 3½ hours at a temperature of about 135° C.

The product was then topped at a temperature of 185° C. for 5 hours at a pressure of 2 to 4 mm. of mercury. The resulting material was a fairly fluid amber colored liquid which had an acid number of about 35. Upon standing at room temperature a small amount of the product crystallized to a white solid dispersed in the liquid. Approximately one half of the acetic anhydride was combined with the resin. The product polymerized to form a hard tough transparent polymer having a Barcol hardness of about 40 upon heating in the presence of 3 percent by weight of benzoyl peroxide according to the following cycle:

16 hours at 50° C.
1 hour at 65° C.
2 hours at 70° C.
1 hour at 75° C.
2 hours at 80° C.
1 hour at 90° C.
0.5 hour at 95° C.
2 hours at 115° C.

The polymerizable composition also is compatible with monomeric styrene, vinyl acetate, diallyl adipate, diallyl phthalate, or diallyl maleate, in amounts up to 40 percent by weight or more. It may be copolymerized with these materials under the cycle above indicated. Styrene and vinyl acetate copolymers may be prepared using 0.5 percent by weight of benzoyl peroxide, and with diallyl esters the peroxide content is preferably 1 to 5 percent by weight.

Somewhat softer polymers may be obtained by use of diethylene glycol or triethylene glycol in lieu of ethylene glycol in this process.

Example 13

248 grams of ethylene glycol and 392 grams of maleic anhydride were heated in a flask as in Example 1 at a temperature rising from 145 to 195° C. for 2 hours and a product having an acid number of 118 was obtained.

To 327 grams of this product was added 41 grams of normal propanol and the mixture was refluxed as in Example 1 at a temperature gradually rising from 119 to 165° C. over a period of 6 hours and heating was continued at 165° C. for a further period of 6 hours. This product was topped by heating at 190° C. for an hour at a pressure of 1 mm. of mercury. The topped product had an acid number of 51.

123 grams of the topped product and 18.5 grams of acetic anhydride were placed in a flask such as described in Example 1 and the mixture heated under a reflux condenser with agitation for 3 hours at a temperature of about 135° C. During this period carbon dioxide was bubbled through the mixture. The product was heated for 5 hours under a pressure of 2 mm. of mercury at 185–190° C. to vaporize volatile impurities and reduce the acid number to about 35.

The product is a viscous liquid which partially crystallized on standing. It polymerized in the presence of 3 percent by weight benzoyl peroxide when heated according to the cycle of Example 1 to form a polymer having a Barcol hardness of 42. Mixtures of this product containing up to 60 percent styrene or vinyl acetate polymerize to form clear compatible copolymers. The product may be copolymerized with diallyl adipate or diallyl phthalate in substantially all proportions to form clear copolymers.

This process also may be used in the production of the corresponding products from 1,2 propylene glycol or polypropylene glycols, 1,3 propylene glycol, pentamethylene glycol, etc.

Example 14

2 moles of phthalic anhydride, 20 moles of maleic anhydride and 22 moles of ethylene glycol were reacted together as in Example 1 until the acid number had been reduced to 82. This required heating at a temperature of 185° C. for 4 hours. To 2105 grams of the resulting product was added 298 grams of normal propanol and the mixture heated under a reflux condenser with agitation for 6 hours at a temperature which gradually rose from 123° C. to 183° C. Carbon dioxide was bubbled through the mixture to maintain an inert atmosphere within the reaction flask. This product had an acid number of about 60.

307 grams of this product was mixed with 18.4 grams of acetic anhydride and heated under a reflux condenser at 135° C. with agitation and in an inert atmosphere for 3 hours.

The resulting composition was heated at 185° C. for 4 hours under a pressure of 2 mm. of mercury. The product was a viscous liquid, having an acid number of about 19, which polymerized as in Example 1 to form copolymers similar to those of Example 2.

*Example 15*

20 moles of ethylene glycol, 3.4 grams of hydroquinone, 16 moles of maleic anhydride and 4 moles of phthalic anhydride were heated as in Example 12 up to about 200° C. for about 2 hours and a product having an acid number of about 123 was secured.

309.5 grams of normal propanol was heated with 3090 grams of the resulting glycol maleate and the mixture was heated under a reflux condenser at reflux temperature. Aliquots were removed after 3½ hours, 6 hours, 8 hours, 10 hours and 15 hours of reflux time respectively. Each of these aliquots were heated with 6% by weight of acetic anhydride based upon the weight of the aliquot at a temperature of 135° C. for 3 hours. The products were topped and polymerized as in Example 1.

The products prepared by acetylation of the 3½ hour and 6 hour samples were substantially more viscous than the other products. All of the products were clear liquids which flowed at room temperature and which polymerized to hard water resistant polymers.

*Example 16*

Equal molecular portions of 1-phenyl ethanediol and maleic anhydride were heated as in Example 12 until a polymerizable product having an acid number of 30 was obtained. This polyhydric alcohol ester was then reacted with normal propanol and then with acetic anhydride as in Example 5 and a polymerizable ester thus secured.

The expression "monohydric alcohol having no other reactive substituent than the hydroxy group," used in some of the claims, is intended to cover monohydric alcohols wherein the substituents, if any, other than the hydroxy group, do not react with the alkyd during the alcoholysis treatment described and claimed herein.

This application is a continuation-in-part of my prior copending application, Serial No. 491,657, filed June 21, 1943.

Although the present invention has been described with particular reference to the specific details of certain specific embodiments thereof, it is not intended that such details shall be regarded as limitations upon the scope of the invention except insofar as included in the accompanying claims.

I claim:

1. A method of treating a polymerizable unsaturated alkyd resin having an acid number below about 150 which comprises heating such resin with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the propylized alkyd with acetic anhydride to esterify free hydroxyl groups.

2. A method of treating a polymerizable unsaturated alkyd resin having an acid number below about 150 which comprises heating such resin under reflux conditions with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the propylized alkyd with acetic anhydride to esterify free hydroxyl groups.

3. A method of treating a polymerizable unsaturated alkyd resin having an acid number below about 150 which comprises heating such resin with methyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the methylized alkyd with acetic anhydride to esterify free hydroxyl groups.

4. A method of treating a polymerizable unsaturated alkyd resin having an acid number below about 150 which comprises heating such resin with allyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the alcoholized alkyd with acetic anhydride to esterify free hydroxyl groups.

5. A method of treating a polymerizable unsaturated alkyd resin having an acid number below about 150 which comprises heating such resin with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, reacting the propylized alkyd with acetic anhydride to esterify free hydroxyl groups, removing volatile constituents and heating the resulting alkyd to lower the acid number thereof.

6. A method of treating a polymerizable unsaturated alkyd resin having an acid number below about 150 which comprises heating such resin under reflux conditions with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, reacting the propylized alkyd with acetic anhydride to esterify free hydroxyl groups, removing volatile constituents and heating the resulting alkyd to lower the acid number thereof.

7. The method set forth in claim 6 wherein the unsaturated alkyd of an acid number below about 150 is formed by reacting ethylene glycol with a mixture of maleic anhydride and phthalic anhydride.

8. A method of treating a polymerizable unsaturated alkyd resin having an acid number below about 150 which comprises heating such resin under reflux conditions with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, thereby lowering the acid number of the resin, the amount of propyl alcohol so introduced exceeding that accountable for by the reduction in the acid number, removing unreacted propyl alcohol, reacting the propylized alkyd with acetic anhydride to esterify free hydroxyl groups, removing volatile constituents and heating the resulting alkyd to lower the acid number thereof.

9. The method set forth in claim 8 wherein the unsaturated alkyd of an acid number below about 150 is formed by reacting ethylene glycol with a mixture of maleic anhydride and phthalic anhydride.

10. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the alcoholized alkyd with an acidic material of the class consisting of a monocarboxylic acid and the anhydride thereof having no other group than the acid group capable of reacting with free hydroxyl groups in the reaction to esterify free hydroxyl groups.

11. A method of treating a polymerizable unsaturated alkyd resin having an acid number below about 75 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the modified alkyd with a monocarboxylic acid having no other group than the carboxyl group capable of reacting with free hydroxyl groups in the reaction to esterify free hydroxyl groups.

12. A method of treating a polymerizable unsaturated alkyd resin having an acid number below about 75 which comprises heating such resin under reflux conditions with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the modified alkyd with an acidic material of the class consisting of a monocarboxylic acid and the anhydride thereof having no other group than the acid group capable of reacting with free hydroxyl groups in the reaction to esterify free hydroxyl groups.

13. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, reacting the alcoholized alkyd with an acidic material of the class consisting of a monocarboxylic acid and the anhydride thereof having no other group than the acid group capable of reacting with free hydroxyl groups in the reaction to esterify free hydroxyl groups, removing volatile constituents and heating the modified alkyd to lower the acid number thereof.

14. A method of treating a polymerizable unsaturated alkyd resin having an acid number below about 150 which comprises heating such resin under reflux conditions with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, reacting the alcoholized alkyd with an acidic material of the class consisting of a monocarboxylic acid and the anhydride thereof having no other group than the acid group capable of reacting with free hydroxyl groups in the reaction to esterify free hydroxyl groups, removing volatile constituents and heating the modified alkyd to lower the acid number thereof.

15. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, thereby lowering the acid number of the resin, removing unreacted alcohol, reacting the alcoholized alkyd with an acidic material of the class consisting of a monocarboxylic acid and the anhydride thereof having no other group than the acid group capable of reacting with free hydroxyl groups in the reaction to esterify free hydroxyl groups, removing volatile constituents and heating the modified alkyd to lower the acid number thereof.

16. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, thereby lowering the acid number of the resin, the amount of alcohol so introduced exceeding that accountable for by the reduction in the acid number, removing unreacted alcohol, reacting the alcoholized alkyd with an acidic material of the class consisting of a monocarboxylic acid and the anhydride thereof having no other group than the acid group capable of reacting with free hydroxyl groups in the reaction to esterify free hydroxyl groups, removing volatile constituents and heating the modified alkyd to lower the acid number thereof.

17. A method of treating a polymerizable unsaturated alkyd resin having an acid number below about 150 which comprises heating such resin under reflux conditions with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, thereby lowering the acid number of the resin, the amount of alcohol so introduced exceeding that accountable for by the reduction in the acid number, removing unreacted alcohol, reacting the alcoholized alkyd with an acidic material of the class consisting of a monocarboxylic acid and the anhydride thereof having no other group than the acid group capable of reacting with free hydroxyl groups in the reaction to esterify free hydroxyl groups, removing volatile constituents and heating the modified alkyd to lower the acid number thereof.

18. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the alcoholized alkyd with a drying oil fatty acid to esterify free hydroxyl groups.

19. A method of treating a polymerizable unsaturated alkyd resin having an acid number below about 150 which comprises heating such resin with a monohydric alcohol having no other reactive substituent than the hydroxy group in an amount and for a time sufficient to effect a reaction between the resin and the alcohol and to introduce into the resin in excess of 0.02 but not more than about 0.75 mol of alcohol per mol of unsaturated dibasic acid used in forming the alkyd, thereby lowering the acid number of the resin, removing unreacted alcohol, and reacting the alcoholized alkyd with a drying oil fatty acid to esterify free hydroxyl groups.

20. A method of treating a polymerizable unsaturated alkyd resin having an acid number below about 150 which comprises heating such resin with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the propylized alkyd with acetic acid to esterify free hydroxyl groups.

21. A method of treating a polymerizable unsaturated alkyd resin having an acid number below about 150 which comprises heating such resin under reflux conditions with normal propyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the propylized alkyd with acetic acid to esterify free hydroxyl groups.

22. A method of treating a polymerizable unsaturated alkyd resin having an acid number below about 150 which comprises heating such resin with methyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the methylized alkyd with acetic acid to esterify free hydroxyl groups.

23. A method of treating a polymerizable unsaturated alkyd resin having an acid number below about 150 which comprises heating such resin with allyl alcohol in an amount and for a time sufficient to effect a reaction between the resin and the alcohol and to introduce into the resin in excess of 0.02 but not more than about 0.75 mol of alcohol per mol of unsaturated dibasic acid used in forming the alkyd, and reacting the alcoholized alkyd with acetic acid to esterify free hydroxyl groups.

CHARLES GOULD.

REFERENCES CITED

The following references are of record in the file of this patent:

UNITED STATES PATENTS

| Number | Name | Date |
|---|---|---|
| 2,280,242 | Kropa et al. | Apr. 21, 1942 |
| 2,035,528 | Brubaker | Mar. 31, 1936 |
| 2,195,362 | Ellis | Mar. 26, 1940 |
| 2,280,256 | Patterson | Apr. 21, 1942 |